(12) United States Patent
Min

(10) Patent No.: US 10,985,569 B2
(45) Date of Patent: Apr. 20, 2021

(54) PHOTOVOLTAIC SYSTEM POWER OUTPUT CONTROL WITH RETAINED RESERVE POWER OUTPUT

(71) Applicant: The Research Foundation for the State University of New York, Albany, NY (US)

(72) Inventor: Qilong Min, Slingerlands, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 514 days.

(21) Appl. No.: 15/647,864

(22) Filed: Jul. 12, 2017

(65) Prior Publication Data

US 2018/0019594 A1 Jan. 18, 2018

Related U.S. Application Data

(60) Provisional application No. 62/361,074, filed on Jul. 12, 2016.

(51) Int. Cl.
| | |
|---|---|
| *H02J 3/38* | (2006.01) |
| *G01W 1/02* | (2006.01) |
| *G01W 1/12* | (2006.01) |
| *G06Q 10/04* | (2012.01) |
| *H02S 50/15* | (2014.01) |
| *H02S 50/00* | (2014.01) |
| *H02J 13/00* | (2006.01) |

(52) U.S. Cl.
CPC ............... *H02J 3/383* (2013.01); *G01W 1/02* (2013.01); *G01W 1/12* (2013.01); *G06Q 10/04* (2013.01); *H02J 3/385* (2013.01); *H02S 50/00* (2013.01); *H02S 50/15* (2014.12); *H02J 13/0006* (2013.01)

(58) Field of Classification Search
CPC .. H02J 3/383; H02J 3/385; H02J 3/004; H02J 3/381; H02J 13/0006; H02J 2300/24; H02J 2300/26; H02S 50/00; H02S 50/15; G06Q 10/04; G01W 1/02; G01W 1/12; Y02E 40/70; Y02E 10/56; Y04S 10/123
See application file for complete search history.

(56) References Cited

U.S. PATENT DOCUMENTS

| | | |
|---|---|---|
| 9,565,377 B2 | 2/2017 | Hamann et al. |
| 9,645,180 B1 | 5/2017 | Hoff |

(Continued)

OTHER PUBLICATIONS

Yankee Environment Systems, Inc., Multi-filter rotating shadow band radiometer model mfr-7, Specification (Year: 2004).*

*Primary Examiner* — Eli S Mekhlin
*Assistant Examiner* — Dujuan A Horton
(74) *Attorney, Agent, or Firm* — Garrett Smith; Michael Krenicky; Steven A. Wood, Jr.

(57) ABSTRACT

A photovoltaic power station includes, for example, a plurality of solar panels at a first location, the plurality of solar panels operable to provide a maximum power output, a controller operable to supply, from the plurality of solar panels, a predetermined power output less than the maximum power output to an electrical grid, and wherein the photovoltaic power station is operable to maintain, from the plurality of solar panels, a reserve power output to provide the reserve power output to the electrical grid, the reserve power output being the difference between the maximum power output and the predetermined power output.

17 Claims, 16 Drawing Sheets

(56) References Cited

U.S. PATENT DOCUMENTS

| | | | | |
|---|---|---|---|---|
| 2014/0083413 A1* | 3/2014 | Bibi | ........................ | G01W 1/02 |
| | | | | 126/601 |
| 2015/0331972 A1* | 11/2015 | McClure | ................. | H02S 99/00 |
| | | | | 703/2 |
| 2015/0371431 A1* | 12/2015 | Korb | .................... | H04N 19/136 |
| | | | | 382/113 |
| 2017/0124694 A1 | 5/2017 | Ma et al. | | |

* cited by examiner

PHOTOVOLTAIC SYSTEM POWER OUTPUT CONTROL WITH RETAINED RESERVE POWER OUTPUT

CLAIM TO PRIORITY

This application claims the benefit of U.S. Provisional Application No. 62/361,074, filed Jul. 12, 2016, entitled "Combination Radiometer And Sky Imager Systems," which application is hereby incorporated herein in its entirety by reference.

FIELD OF THE DISCLOSURE

The present disclosure relates generally to photovoltaic systems, and more particularly to photovoltaic system power output control, forecasting and measurement with retained reserve power output.

BACKGROUND

A multi-filter rotating shadowband radiometer is a sun photometer that collects sky radiation through a diffuser, and uses a rotating shadowband to separately measure the global and diffuse components of the radiative field. The direct component is derived as the difference between the two measurements.

Images of the sky, commonly referred to as "sky images," are employed in diverse applications. For example, astronomers utilize sky images for analyzing cosmic movements and meteorological departments use these images to predict local weather conditions. In one application, sky images may be utilized to observe the sun and clouds and to predict cloud cover, cloud movement over a given period, and solar radiation received at a particular location over a given time period. Determination of such cloud characteristics and solar irradiance may be employed in solar plants (employing solar panels or photovoltaic power grids) to ascertain or predict power output of the solar PV panel array for particular time intervals and to control the solar power output for the grid based on cloud movement.

A photovoltaic power station is a large-scale photovoltaic system designed for the supply of merchant power into an electricity grid. A grid-connected home solar electric or PV system receives back-up power from a utility's grid when the PV system is not producing enough power. When the system produces excess power, the utility is required to purchase the power through a metering and rate arrangement. Solar panels of photovoltaic power stations may be disposed in a fixed tilt or fixed or use a single axis or dual axis solar tracker. Solar panels for grid-connected home PV systems are typically disposed in a fixed orientation.

Solar panels produce direct current (DC) electricity, which is typically converted by an inverter to alternating current (AC) which is necessary for transmission across power grids. To maximize efficiency, maximum power point trackers, either within the inverters or as separate units are employed to keep the system close to its peak power point or peak power output by periodically adjusting the tilt of the solar panels. There are many kinds of MPPT (Maximum Power Point Tracker) products in the market, some of them are independent MPPT, and some of them are integrated into the solar inverters. However, the products work in MPPT mode, making the PV array output maximum solar power.

SUMMARY

Shortcomings of the prior art are overcome and additional advantages are provided through the provision, in one embodiment of a photovoltaic power station, which includes, for example, a plurality of solar panels at a first location, the plurality of solar panels operable to provide a maximum power output, a controller operable to supply, from the plurality of solar panels, a predetermined power output less than the maximum power output to an electrical grid, and wherein the photovoltaic power station is operable to maintain, from the plurality of solar panels, a reserve power output to provide the reserve power output to the electrical grid, the reserve power output being the difference between the maximum power output and the predetermined power output.

In another embodiment, a method includes, for example, determining, by a processor at a first location, a future estimation of maximum power output from a plurality of solar panels, and forwarding, by a processor at a first location, the future estimation of maximum power output from the plurality of solar panels to an electrical utility at a second location remote from the first location.

In another embodiment, a method includes, for example, receiving, by a processor at a second location, a future estimation of maximum power output from a photovoltaic power station disposed at a first location remote from the second location, and forwarding, by the processor from the second location, a first request to the photovoltaic power station at the first location a predetermined future supply of power output to an electrical grid less than the future estimation of maximum power output so as to maintain an estimated future reserve power output from the photovoltaic power station.

Shortcomings of the prior art are overcome and additional advantages are also provided through the provision, in one embodiment of a system, which includes, for example, a sensor for use in measuring spectral radiation, an imager for use in imaging the sky, a shadowband movably positionable over the sensor and the spaced apart imager, and a computing unit operably connected to the sensor, the imager, and the shadowband.

In another embodiment, a system includes, for example, a radiometer for measuring spectral radiation of a sky, a sky imager for imaging the sky, and a shadowband movably positionable over the radiometer and the sky imager.

In another embodiment, a method includes, for example, obtaining a spectral radiation measurement of the sky, and obtaining an image of the sky based on the obtained spectral radiation measurement.

In another embodiment, a method includes, for example, obtaining a spectral radiation measurement of the sky, obtaining an image of the sky based on the obtained spectral radiation measurement, and obtaining a characteristic based on the obtained spectral radiation measurement and/or the obtained image of the sky.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

The present disclosure and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the disclosure in detail. It should be understood, however, that the detailed description and the specific examples, while indicating embodiments of the present disclosure, are given by way of illustration only, and are not by way of limitation. Various substitutions, modifications, additions and/or arrangements within the spirit and/or scope of the underlying concepts will be apparent to those skilled in the art from this disclosure. Reference is made below to the drawings, which are not drawn to scale for ease of understanding, wherein the same reference numbers used throughout different figures designate the same or similar components.

The present disclosure is directed generally to a combination radiometer and sky imager. In some embodiments, the present disclosure is directed to a multi-scan multi-filter radiometer and an all sky imager. Advantages of the present disclosure may include the combination or integration of the system of radiometer and sky imager which allows better radiometric calibration for the sky imager and better angular distribution for radiometer diffuse irradiance. The combined system may be used for monitoring solar radiation and air quality/atmospheric conditions, for deriving optical properties of aerosol, cloud, ozone, water vapor, and liquid water path in the atmosphere, and for solar energy monitoring and short-term solar energy.

The present disclosure is also directed generally to throttling of power and voltage output of solar panel/farms to adjust for volatility in production or changes in demand. Power output of a PV system can be throttled between 0 and Pmax, the maximum power potential for the system. For example, a predetermined or pre-defined power level, Pset, may be determined/forecasted for a given system on a given time and the system may be able to throttle up to Pmax or down (to 0) based on eather conditions, or grid requirements. A reserve margin: Presv=Pmax−Pset may serve as a back-up energy. The preserved power margin in the PV systems can act like an instantaneously responsive battery that can be smartly dispatched: a) to compensate for forecasting errors to ensure the real power output equals to the forecasted power output, or b) during frequency transients to stabilize the grid.

Figure 1:
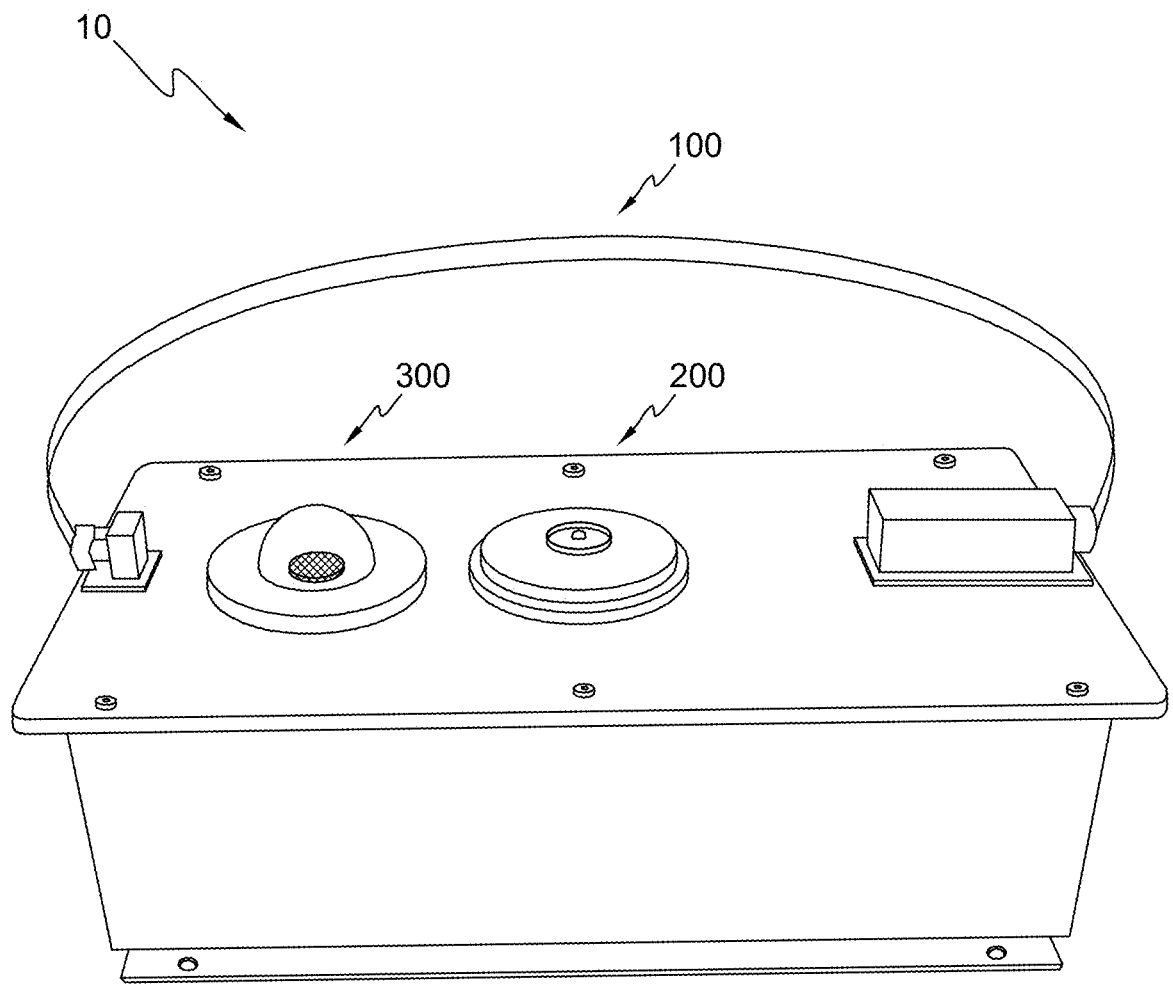
FIG. 1 is a perspective view of a combination radiometer and sky imager system in accordance with an embodiment of the present disclosure.
Figure 2:
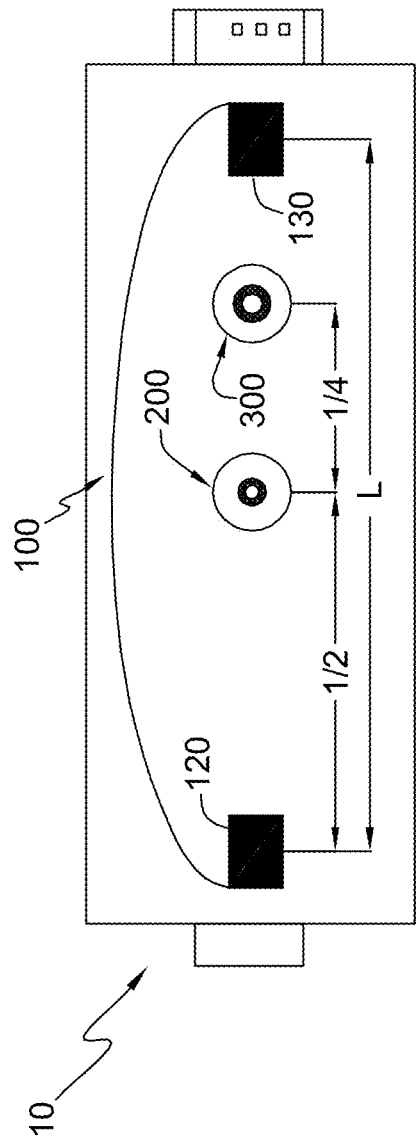
FIG. 2 is a top view of the combination radiometer and sky imager system of FIG. 1.
Figure 3:
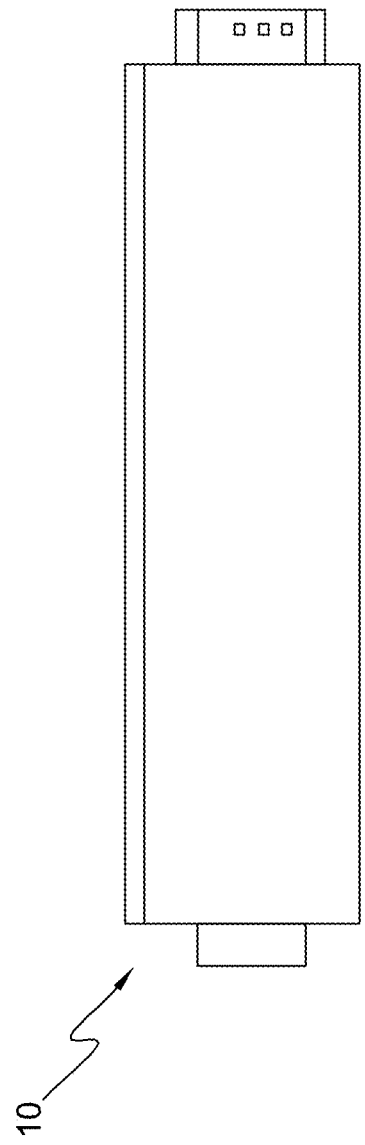
FIG. 3 is a side elevational view of the combination radiometer and sky imager system of FIG. 1.

FIGS. 1-3 illustrate one embodiment of a combination radiometer and sky imager system 10 according to an embodiment of the present disclosure. System 10 may be configured as a multi-scan multi-channel radiometer and shadowband sky imager System. For example, system 10 may provide accurate, user-friendly, and cost-effective radiation and remote sensing capability and services for weather, climate, air quality, and/or solar energy applications. System 10 may include accurate spectral radiation measurements with angular distribution, advanced data processing and retrieval package, user-friendly CLOUD server/remote control for operations and maintenance (O&M), data archiving and processing, and/or cost-effective resolution of measurements and services.

For example, in some embodiments, an instrument of the present disclosure may include a newly developed radiometer that measures spectral direct and diffuse irradiation at 415, 500, 610, 665, 860, 940, and 1640 nanometers. Based on a new scanning technique of shadowband, this radiometer enables measurement of the forward scattering lobe of the direct solar beam through aerosols or thin clouds. Advantages of simultaneous measurements of forward scattering lobe (plus direct) and diffuse radiations using the same sensor allow a more accurate calibration of both direct and diffuse radiations using Langley regression, and thus a more accurate atmospheric transmittance. Consequently, it enables more accurate retrievals of optical depth of interested species of aerosol, cloud, ozone, and water vapor. Based on the measured forward scattering lobe, the instrument of the present disclosure may also be able to retrieve particle effective size.

The instrument also includes an all sky imager with 180 degrees of field of view. The sky imager is operable to monitor atmospheric conditions and to detect cloud cover and cloud motion, as radiation angular distribution. The sky imager uses the same shadowband for blocking solar direct radiation, providing better imaging of the atmosphere.

As shown in FIGS. 1 and 2, system 10 may generally include a shadowband 100, a radiometer 200, and a sky imager 300. Such a system may provide a unique design to measure spectral and angular distribution of solar radiation.

Figure 4:
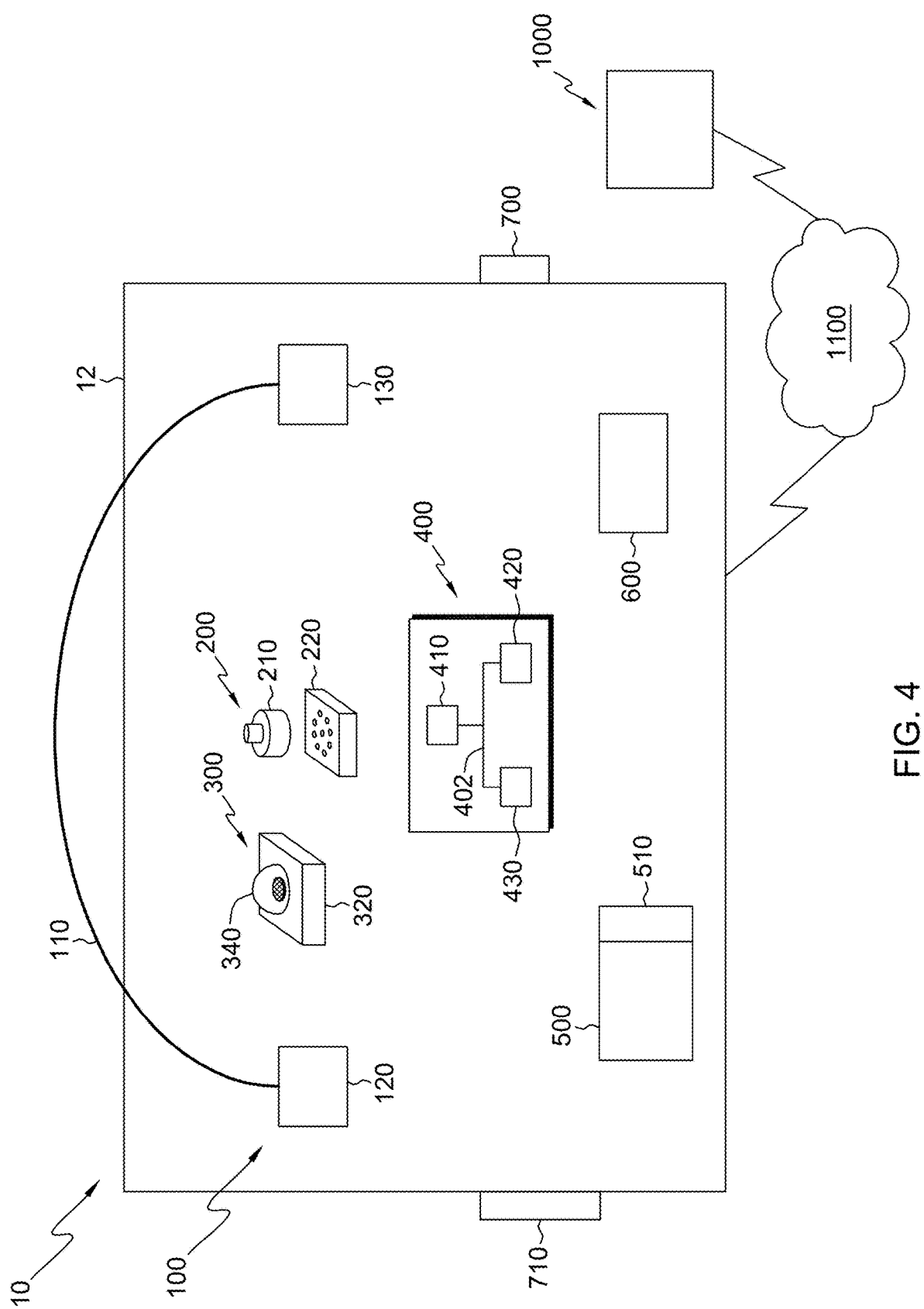
FIG. 4 is a block diagram of the combination radiometer and sky imager system of FIG. 1.

With reference to FIG. 4, system 10 may include shadowband 100 having an elongate band 110, a motor 120 such as a stepper motor operably attached as one end to band 110, and a mount 130 pivotally attached to the other end of band 110. Radiometer 200 may include a diffuser 210 and a plurality of photodetectors 220. Each of the photodetectors may be operable to detect a different frequency. Sky imager 300 may include a lens 310 and an imager 320, which may be a conventional Charge-Coupled Device (CCD) or Complimentary Metal-Oxide-Semiconductor (CMOS) pixel-based imager. With reference again to FIG. 2, motor 120 and mount 130 of shadowband 100 may be spaced apart at a distance L. Radiometer 200 may be disposed in the middle (L/2) between the ends of the elongated band of shadowband 100. Sky imager 300 may be disposed generally in the middle (L/4) between radiometer 200 and an end of shadowband 100. The ends of the shadowband may be spaced apart a distance of about 5 inches to about 25 inches, about 10 inches to about 20 inches, about 10 inches to about 15 inches, about 8 inches, about 10 inches, about 12 inches, about 15 inches, or other suitable distance. The shadowband may have a width of about ¼ inch to about 1 inch, about ½ inch to about ¾ inch, about ¼ inch, about ½ inch, about ¾ inch, or other suitable width. The shadowband may have a thickness of about $1/32$ inch to about $3/32$ inch, about $1/32$ inch, about $1/16$, about $3/32$ inch, or other suitable thickness. The radiometer is disposed in the middle between the ends of the shadowband, and the sky imager is disposed in the middle between the radiometer and one of the ends of the shadowband.

With reference again to FIG. 4, system 10 may also include a computing unit 400 operably connected to shadowband 100, radiometer 200, and sky imager 300. Computing unit 400 may include, but is not limited to, one or more processors or processing units 410, memory 420, one or more input/output devices or input/output interfaces 430, and a bus 402 that couples the various components together. By way of example, and not limitation, computing unit may be a microprocessor or other suitable microcontroller. Memory 420 can include computer readable media in the form of volatile memory, such as random access memory (RAM), and or other removable/non-removable, volatile/non-volatile computer system storage media. Input/output devices 430 may interface with or communicate with one or more external devices such shadowband 100, radiometer 200, and sky imager 300, global positioning systems, global networks, and other suitable components such as described below.

System 10 may also include a housing 12 for housing the components described above, and also include a power supply 500 having a fan 510, a heater 600, and an exhaust fan 700 and a controllable exhaust vent 710. The heater and exhaust fan and exhaust vent may be operably controlled by the computing unit to regulate the temperature experienced in housing 12 of system 10. By regulating the temperature in system 10, the operations and calibration of the radiometer and sky imager may be better maintained compared to the radiometer and sky imager being subject to ambient conditions.

System 10 may be operably connected to a remote computing unit 1000 such as a remote computer. For example, computing unit 400 may be operable for transmitting to and receiving from a remote computing unit 1000 such as via a communications network 1100. The communications network may be a global communications network such as the Internet or cellular network, or a local area network, or other suitable network.

Many applications, such as monitoring solar radiation, weather conditions, air quality monitoring, and solar photovoltaic efficiency, require accurate measurements of both spectral and angular solar radiation. System 10 employs a shared rotating shadowband 100 for both radiometer 200 and sky imager 300, with a narrow band and precise rotation controlled by computing unit 400, enhancing the capability of both radiometer and sky imager, and enabling more accurate measurement of spectral and angular solar radiation. Radiometer 200 measures spectral solar radiation accurately at multiple passbands in UV, Visible, Near-Infrared regions. Sky imager 300 detects total sky (180 degree) radiation angular distribution in the atmosphere for cloud cover distribution and cloud motion.

The radiometer may be operable to measure not only spectral direct and diffuse irradiation separately, but also the polar angle resolved diffuse irradiances corresponding to the shadowband strip positions. The radiometer may resolve the forward scattering lobe of the direct solar beam (solar aureole) through aerosols and/or thin clouds. The advantage of simultaneous measurements of the solar aureole (plus direct) and the diffuse radiations using the same sensor is a substantial improvement in the radiometric calibration of both direct and diffuse radiations, and thus more accurate atmospheric solar radiation measurements. Improvement in calibration may be about 1 percent to about 10 percent, about 1 percent and 2 percent, or about 5 percent to about 10 percent.

The rotating shadowband accurately rotates around the polar axis to block a strip (within 2 degrees of angle) of scattering light. The irradiance corresponding to the shadowband strip is obtained by differencing the blocked and unblocked irradiances measured by a Lambertian detector. The diffuser, the width of shadowband strip, and rotating geometry would limit the umbral angle of the blocking shadowband, and thus limit the first blocking angle away from the Sun sensor direction. Within the umbral angle, the shadowband fully or partially blocks the sun, the total irradiance contains the full or part direct beam irradiance and the forward scattered irradiance in the umbral angle. If not properly removing the forward scattering irradiance from the total irradiance in the sun-sensor direction, the direct beam irradiance is not accurate. However, with the present disclosures precise rotating mechanism, the forward scattering lobe of solar aureole outside the umbral angle may be accurately measured. Based on the Fraunhofer diffraction approximation, the forward scattered irradiance in the sun-sensor direction may be estimated from extrapolation of the measured forward scattering lobe of solar areole. Therefore, both solar direct beam irradiance and full forward scattering lobe of solar aureole may be accurately measured (resolved). Langley regression of the corrected direct normal irradiance taken on stable, clear days can be used to extrapolate the instrument's response to the top of the atmosphere (TOA). It provides accurate calibration for the direct beam transmittance without absolute calibration. Further, the advantage of the shadowband technique is that the forward scattering lobe (with direct normal irradiance) and the total horizontal irradiance are simultaneously measured by the same detector. The direct beam calibration can then be applied to the total horizontal irradiance. Transmittances are calculated subsequently under all-sky conditions as the ratio of the uncalibrated signal to the extrapolated TOA value.

Blocking the sun for the sky imager with the shadowband may enhance the dynamic range of the sky imager to detect optically thin clouds, and transfer the calibration of radiometer to sky imager, using simultaneous and precise rotation control. Both the radiometer and the sky imager share a rotating shadowband with a precise rotating control. The direct beam and the polar angle resolved diffuse irradiances from the radiometer provide the accurately calibrated values for integrated (along the azimuthal angles) radiance measurements of blocked pixels of sky-imager. The calibration coefficients of sky-imager pixels may be determined through the precisely shared rotating scans (with a few tenth of degrees of rotating increment). Therefore, the accurate forward scattering corrected Langley calibration irradiance is transferred from radiometer to the sky-imager pixels. Hence, the calibrated sky-imager provides accurate angular distribution of solar radiation.

In some embodiments, a method may include obtaining a spectral radiation measurement of the sky, and obtaining an image of the sky based on the obtained spectral radiation measurement. The obtaining the spectral radiation measurement of the sky and the obtaining the image of the sky may occur generally simultaneously. Obtaining the spectral radiation measurement and the image of the sky may occur when blocking a portion of the sky such as using a shadowband. The obtaining the spectral radiation measurement of the sky may include obtaining one or more wavelength measurements of the sky. The obtaining the spectral radiation measurement of the sky may include obtaining one or more wavelength measurements comprising 415 nanometers, 500 nanometers, 610 nanometers, 665 nanometers, 860 nanometers, 940 nanometers, and/or 1640 nanometers.

The obtaining the image of the sky may include calibrating an imager based on the obtained spectral radiation measurement. For example, the obtaining the image of the sky may include determining an image exposure based on the obtained spectral radiation measurement. In other embodiments, a shadowband may be positioned over the sky imager to block the sun when taking a first image of the sky using a short exposure. Then using the first image, the shadowband may be positioned over the sky imager to block the sun when taking a second image of the sky using a longer exposure.

Both the radiometer and the sky imager share a rotating shadowband with a precise rotating control. The direct beam and the polar angle resolved diffuse irradiances from the radiometer provide the accurately calibrated values for integrated (along the azimuthal angles) radiance measurements of blocked pixels of sky-imager. The calibration coefficients of sky-imager pixels may be determined through the precisely shared rotating scans (with a few tenth of degrees of rotating increment). Therefore, the accurate forward scattering corrected Langley calibration irradiance transfer from radiometer to the sky-imager pixels is enabled. And hence, the calibrated sky-imager provides a more accurate angular distribution of solar radiation.

With the present disclosures precise rotating mechanism, the forward scattering lobe of solar aureole outside the umbral angle may be accurately measured by the radiometer. As discussed above, therefore, both solar direct beam irradiance and full forward scattering lobe of solar aureole may be accurately measured (resolved). Also, the forward scattering lobe of solar aureole is captured by the sky imager. Based on Fraunhofer diffraction theory, the forward scattering lobe is a function of particle size of scattering particles along the solar-sensor direction. Therefore, the particle size of aerosols or thin clouds can be retrieved from both solar aureole measurements.

Figure 5:
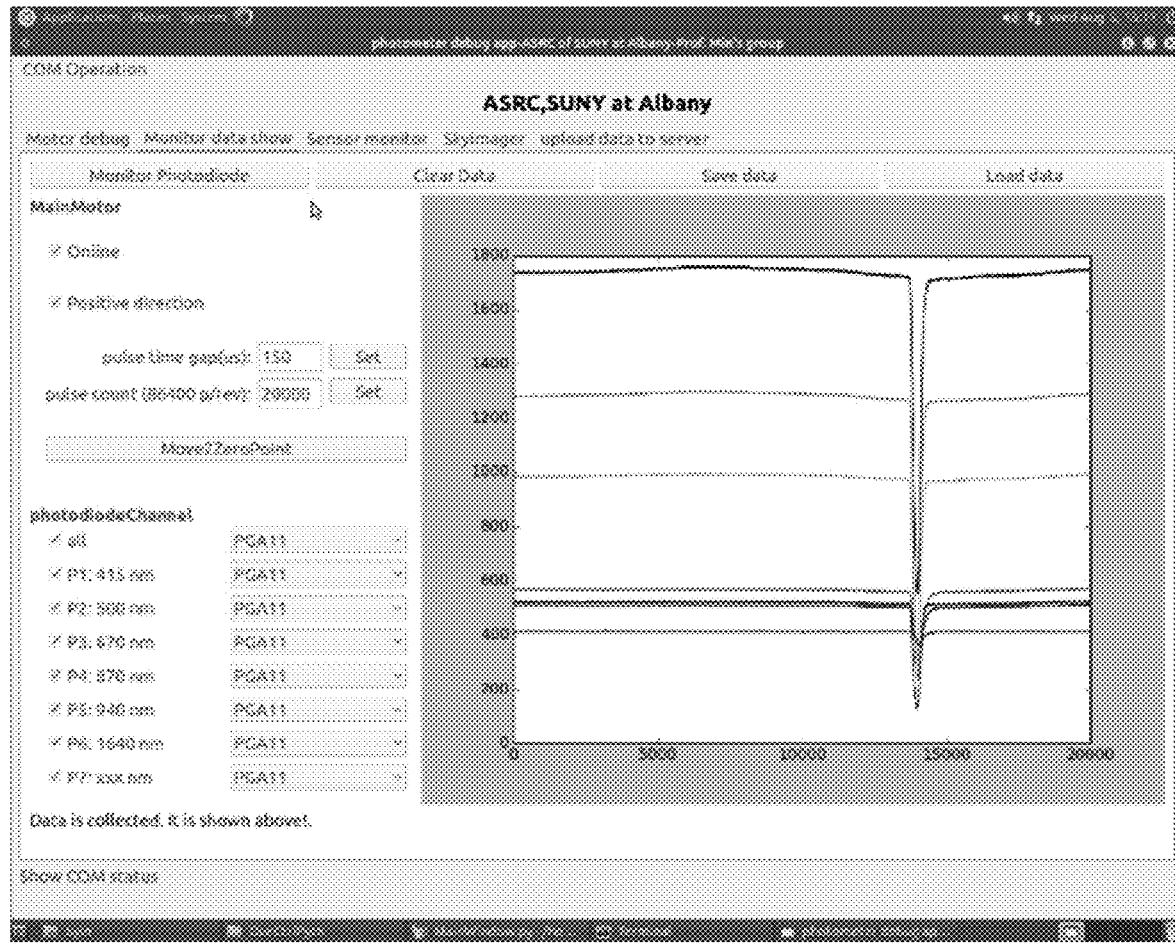
FIG. 5 is a screen display of data obtained using the combination radiometer and sky imager system of FIG. 1.

FIG. 5 is a screen display of data obtained by the radiometer, regarding the spectral resolved radiation as the shadowband scans over the hemisphere using the combination radiometer and sky imager system of FIG. 1.

Figure 6:
FIG. 6 is a screen display of a sky image using the combination radiometer and sky imager system of FIG. 1.

FIG. 6 is a screen display of a sky image using the combination radiometer and sky imager system of FIG. 1. The screen display includes an image of the sky (180 degrees). The radiation distribution, as well as cloud distribution, is accurately captured.

Figure 7:
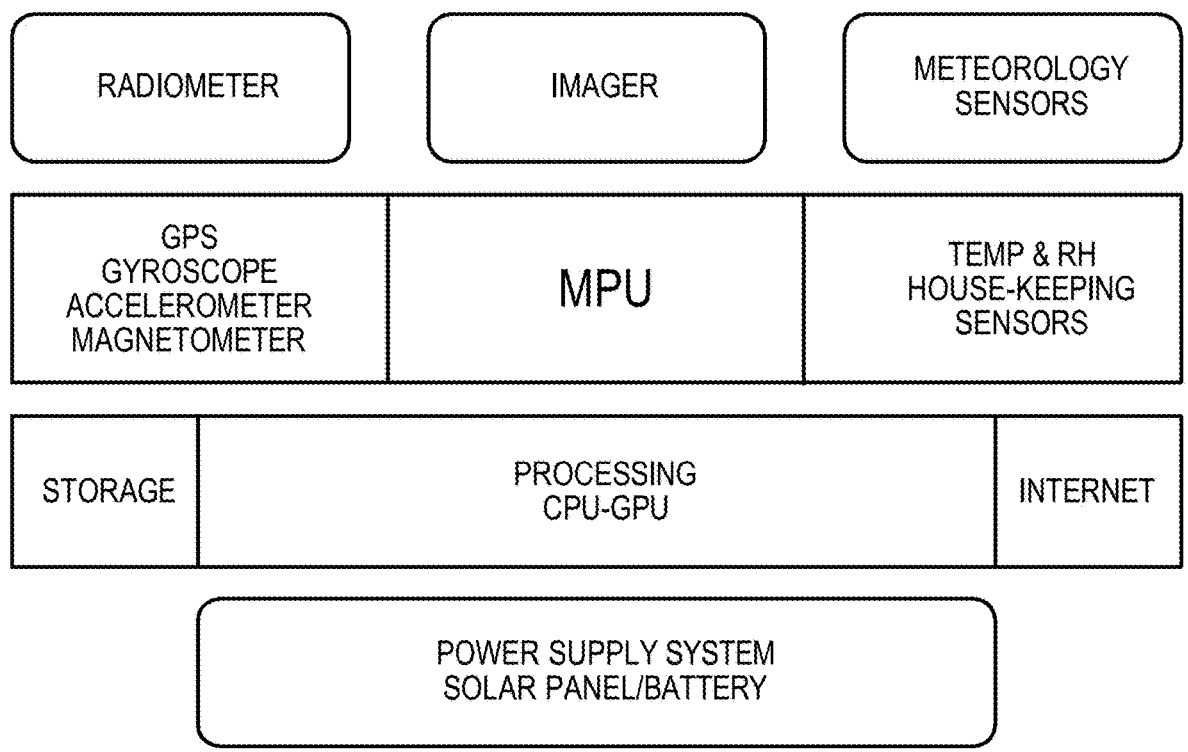
FIG. 7 is a block diagram of a combination radiometer and sky imager system according to an embodiment of the present disclosure.

FIG. 7 is a block diagram of a combination radiometer and sky imager system according to an embodiment of the present disclosure.

Figure 8:
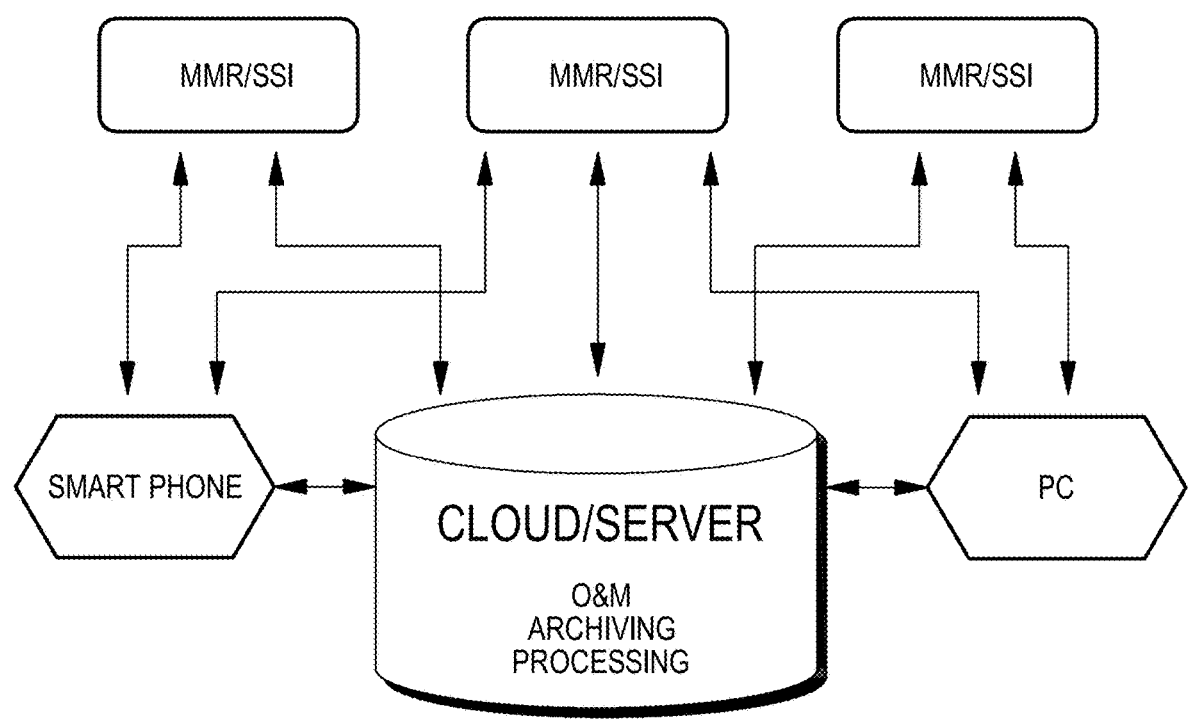
FIG. 8 is a block diagram of a plurality of combination radiometer and sky imager systems according to an embodiment of the present disclosure.

FIG. 8 is a block diagram of a plurality of combination radiometer and sky imager system according to an embodiment of the present disclosure.

For example, in some embodiments, the system of the present disclosure may measure spectral direct and diffuse irradiation at 415, 500, 610, 665, 860, 940, and 1640 nanometers. Based on a scanning of shadowband, the radiometer may enable measuring the forward scattering lobe of the direct solar beam through aerosols or thin clouds. Advantages of simultaneous measurements of forward scattering lobe (plus direct) and diffuse radiations using the same sensor allow accurate calibration of both direct and diffuse radiations using Langley regression, and thus accurate atmospheric transmittance. Consequently, it enables more accurate retrievals of optical depth of interested species of aerosol, cloud, ozone, and water. Based on the measured forward scattering lobe, the system of the present disclosure may also be able to retrieve particle effective size. The sky imager is operable to monitor atmospheric conditions and to detect cloud cover and cloud motion, as radiation angular distribution. The sky imager can use the same shadowband for blocking solar direct radiation, providing better imaging of the atmosphere.

Advantages of the present disclosure may include the combination or integration of the system of radiometer and sky imager which allows better radiometric calibration for the sky imager and better angular distribution for radiometer diffuse irradiance. The combined system may be used for monitoring solar radiation and air quality/atmospheric conditions, for deriving optical properties of aerosol, cloud, ozone, water vapor, and liquid water path in the atmosphere, and for solar energy monitoring and short-term solar energy.

As described above, the present disclosure is also directed generally to throttling of power and voltage output of solar panel/farms to adjust for volatility in production.

Figure 9:
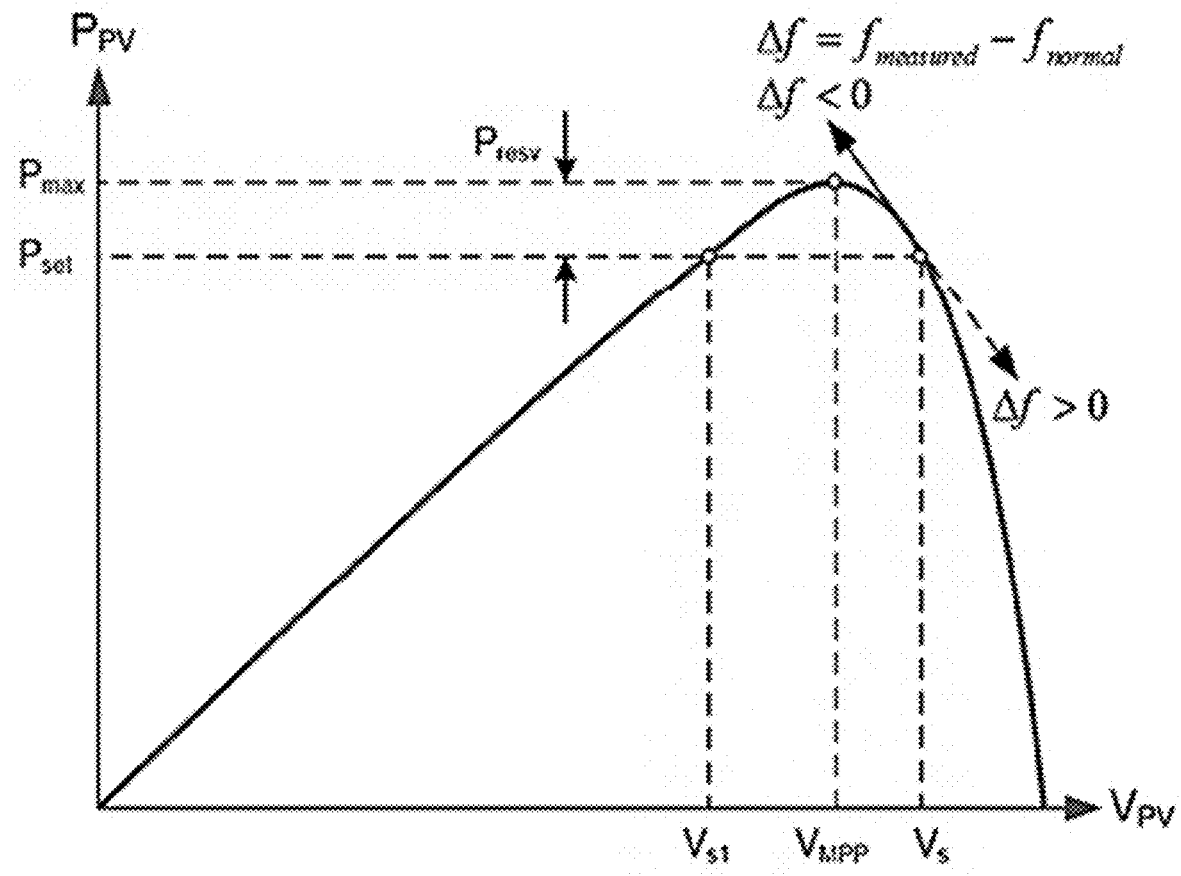
FIG. 9 is graph of power verses voltage in connection with a control principal of solar PV system maximum output with a reserve margin according to an embodiment of the present disclosure.

FIG. 9 illustrates a control principal of solar PV system maximum output with a reserve margin according to an embodiment of the present disclosure. For example, power output of a PV system can be throttled between 0 and Pmax, the maximum power potential for the system. As described above, throttling of power and voltage output of solar panel/farms allows for adjustment to volatility in production and changes in demand. For example, a predetermined or pre-defined power level, Pset, may be determined/forecasted for a given system on a given time and the system may be able to throttle up to Pmax or down (to 0) based on weather conditions, or grid requirements. A reserve margin may follow the equation:

$$Presv = Pmax - Pset$$

and may serve as a back-up energy. The preserved power margin in the PV systems can act like an instantaneously responsive battery that can be smartly dispatched a) to compensate for forecasting errors to ensure the real power output equals to the forecasted power output, or b) during frequency transients to stabilize the grid.

In responding to perturbations, Δf, $P_{set}$ can be adjusted:
Upwards if (Δf<0), and
Downwards (Δf>0)
to dispatch the reserved power:
For the grid stability requirements, and
For compensation the forecast error.

Figure 10:
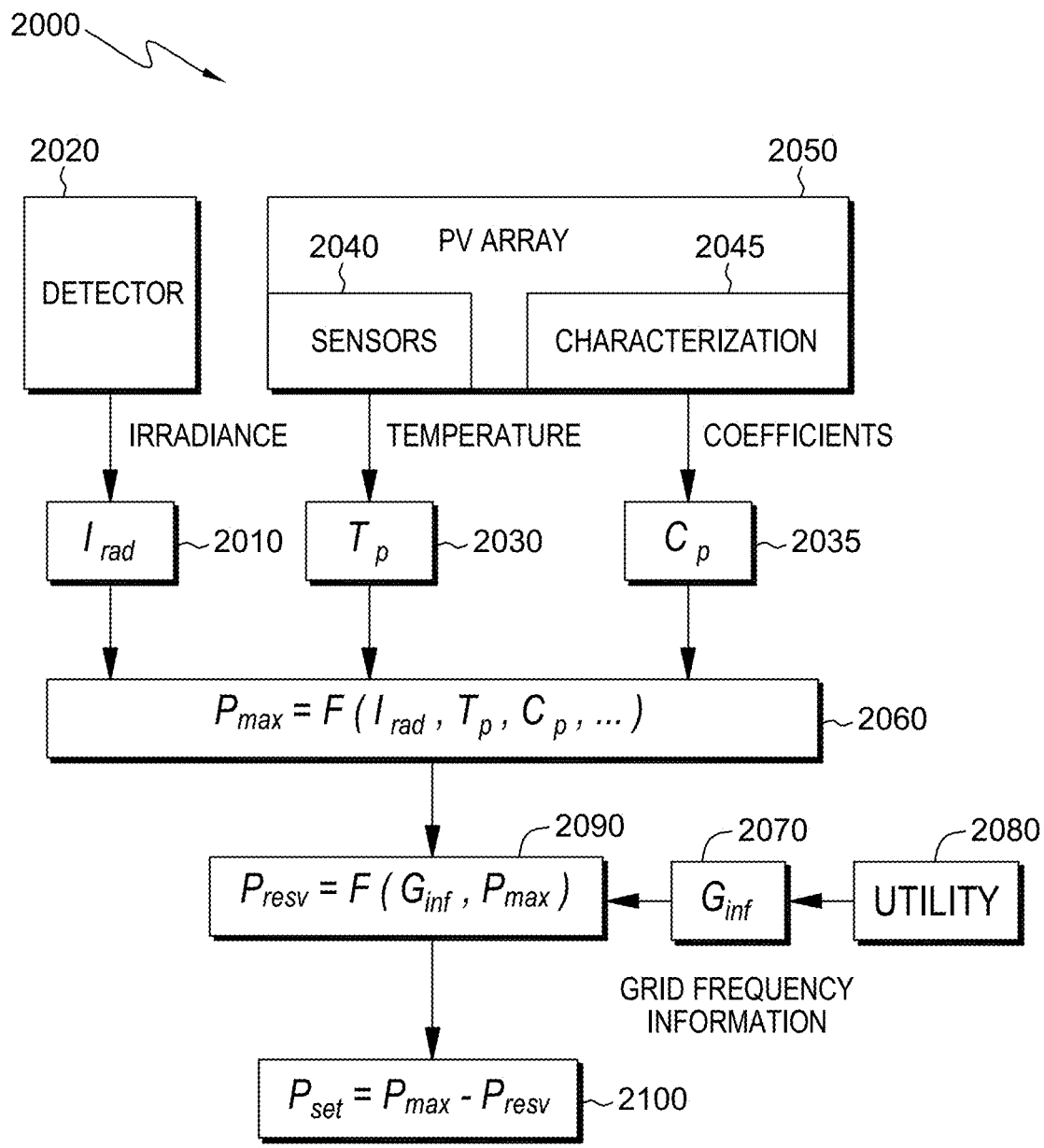
FIG. 10 is a flowchart for a method for determining a predetermined power output according to an embodiment of the present disclosure.

FIG. 10 illustrates a method 2000 for determining a predetermined power output according to an embodiment of the present disclosure. Method 2000 may include providing inputs such as irradiance 2010 from a solar irradiance detector 2020, a temperature input 2030 and coefficient 2035 from a temperature sensor 2040 and a coefficient 2035 from a PV panel characterization 2045, respectively, of a photovoltaic array or panel 2050. The inputs may be employed in determining a maximum output power 2060. A grid frequency information 2070 from a utility 2080 may be combined with maximum output power 2060 to provide a reserve output power 2090. A predetermined output power 2100 may be determined from maximum output power 2060 and reserve output power 2090. In some embodiments in the flowchart of FIG. 10, the solar irradiance detector may be a radiometer, photodiode, or other suitable device for determining solar irradiance or the power per unit area received from the sun. In some embodiments in the flowchart of FIG. 10, the solar irradiance detector may be radiometer/sky imager. In other embodiments in the flowchart of FIG. 10 solar irradiance detector may be provided by the combination radiometer/sky imager as described above.

Figure 11:
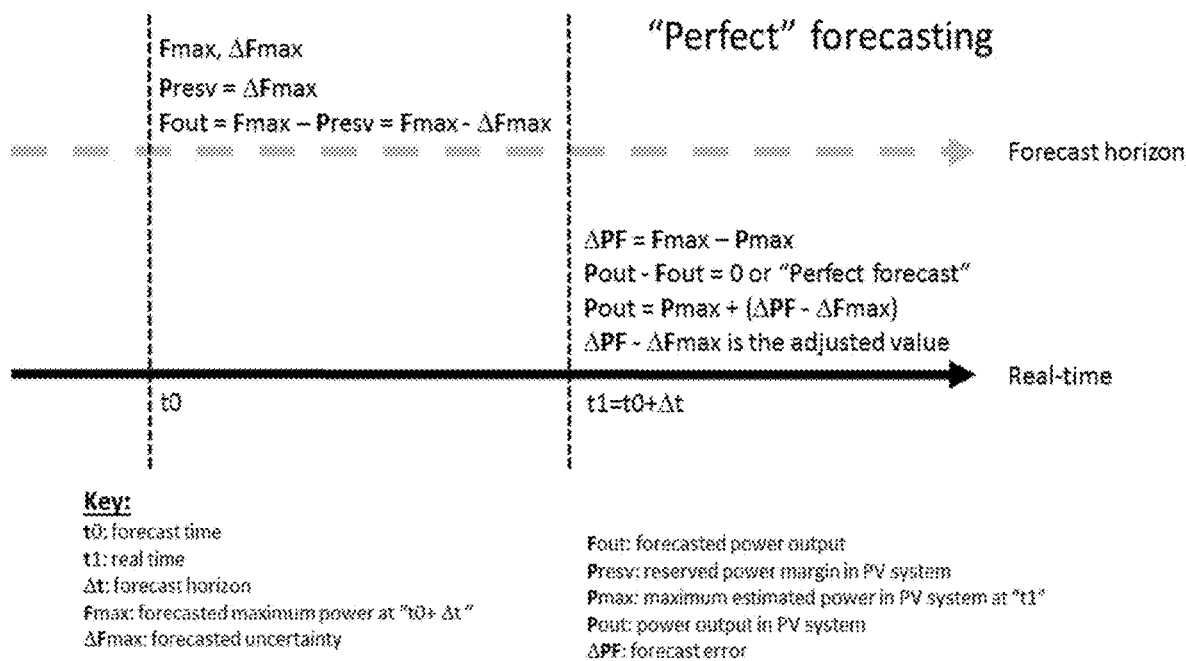
FIG. 11 is an illustration of perfect forecasting and control according to an embodiment of the present disclosure.

FIG. 11 illustrates perfect forecasting in accordance with the present disclosure. For example, given solar radiation and meteorology conditions, the maximum power output (Fmax) from a PV system at the time horizon t1 (=t0+Δt) is forecasted with its associated uncertainty of ΔFmax). The power reserve (Presv) at t1 is assumed to be, Presv=ΔFmax. The predicted PV system power out is set to be Fout (=Fmax−Presv). When the time advances to t1, the real-time maximum power output is evaluated at Pmax. It could be that there is a difference between Fmax and Pmax. The difference is assumed to be ΔPF=(Fmax−Pmax). For a "perfect" forecast, i.e., Pout should equal Fout at t1 moment (Pout=Fout). The Pout should be set to be: Pout=Fout=Pmax+[(Fmax−Pmax)−ΔFmax]. Or Pout=Fout=Pmax+(ΔPF−ΔFmax). By controlling the PV system power output at Pout, a "perfect" forecasting is achieved.

Figure 12:
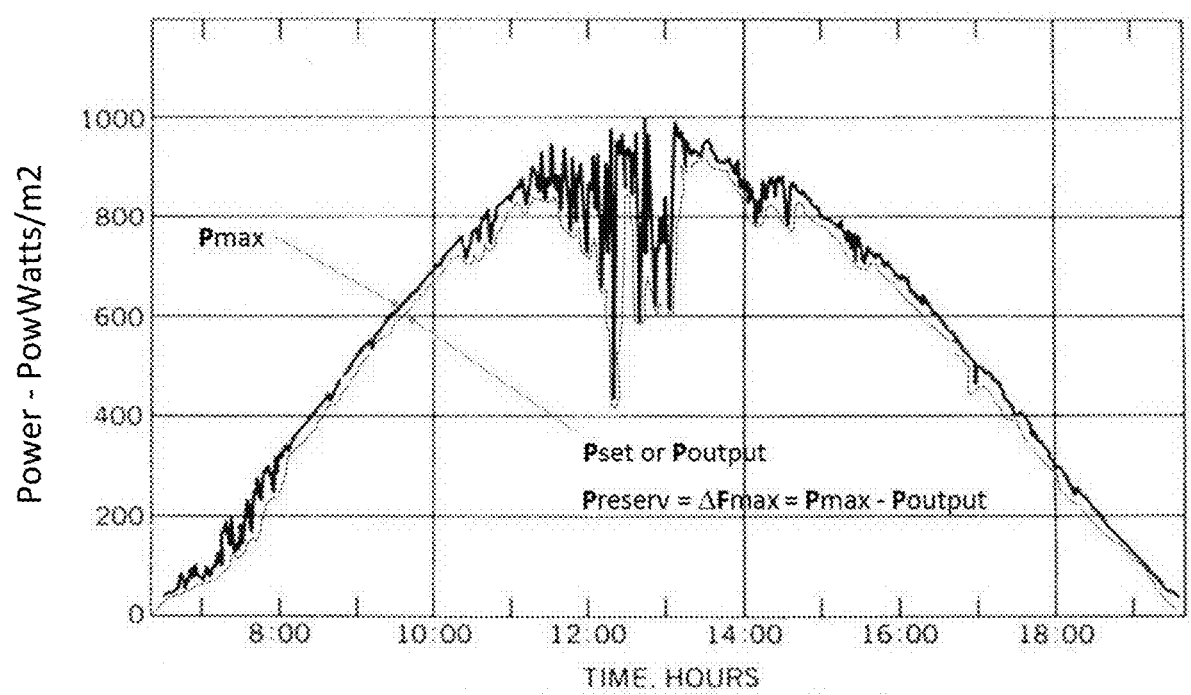
FIG. 12 is a graph illustrating a future estimated maximum power output and a future predetermined power output along with a reserve power output over time according to an embodiment of the present disclosure.

FIG. 12 illustrates a future estimated maximum power output and a future predetermined power output along with a reserve power output over time according to an embodiment of the present disclosure. The Pmax is the PV maximum power out and Pmax (Δt) is the predicted PV maximum power output with an uncertainty of ΔFmax (at Δt). The reserve power in the PV system can be set, such that the Presv=ΔFmax, so that Pset or Poutput can be archived/output from the PV system. Basically, the preserved power margin in the PV systems may act like an instantaneously responsive battery that can be smartly dispatched a) to compensate for forecasting errors to ensure the real power output equals to the forecasted power output, or b) during frequency transients to stabilize the grid.

Figure 13:
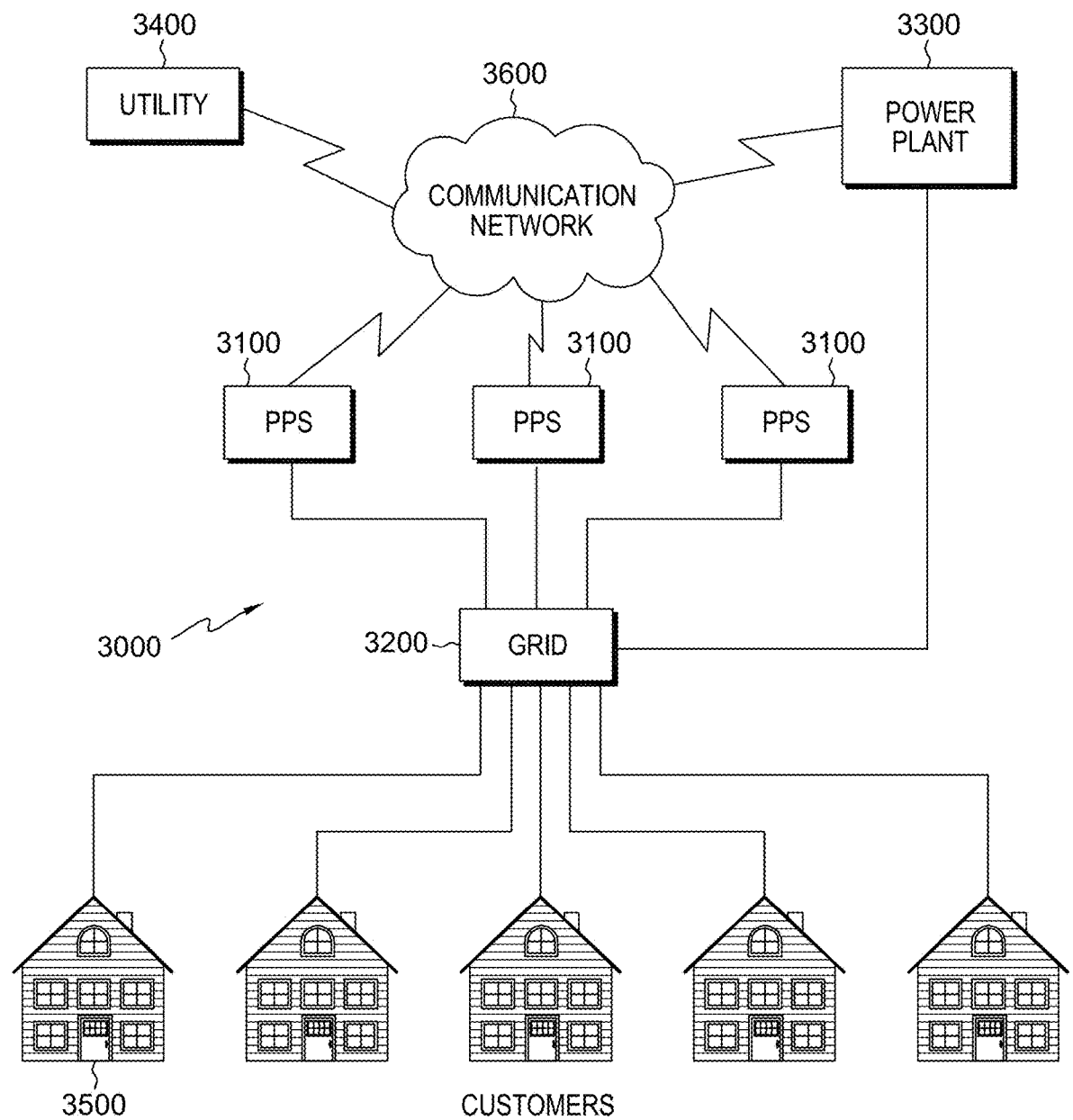
FIG. 13 is a block diagram of a system having a plurality of photovoltaic power stations operable to retain a reserve power output according to an embodiment of the present disclosure.

FIG. 13 illustrates a grid-tied photovoltaic power system 3000 according to an embodiment of the present disclosure. System 3000 may generally include a plurality of photovoltaic power stations 3100, an electrical grid 3200, a power plant 3300 such as a natural gas power plant, a utility 3400, and a plurality of customers 3500 such as residential dwellings and/or businesses. Utility 3400, power plant 3300, and the plurality of photovoltaic power stations 3100 may be connected via a communications network 3600 such as a global communications network such as the Internet or other suitable network. Photovoltaic power system 3000, photovoltaic power stations 3100, and utility 3400 may incorporate the features and techniques of the present disclosure described herein. For example, photovoltaic power system 3000, photovoltaic power stations 3100, and utility 3400 may be operable and work together to throttle power and voltage output from the photovoltaic power stations into the grid to adjust for volatility in production and changing demands of the grid. The throttling of power may be employed in real-time and/or based on future forecasting of available maximum solar power output as described herein.

Figure 14:
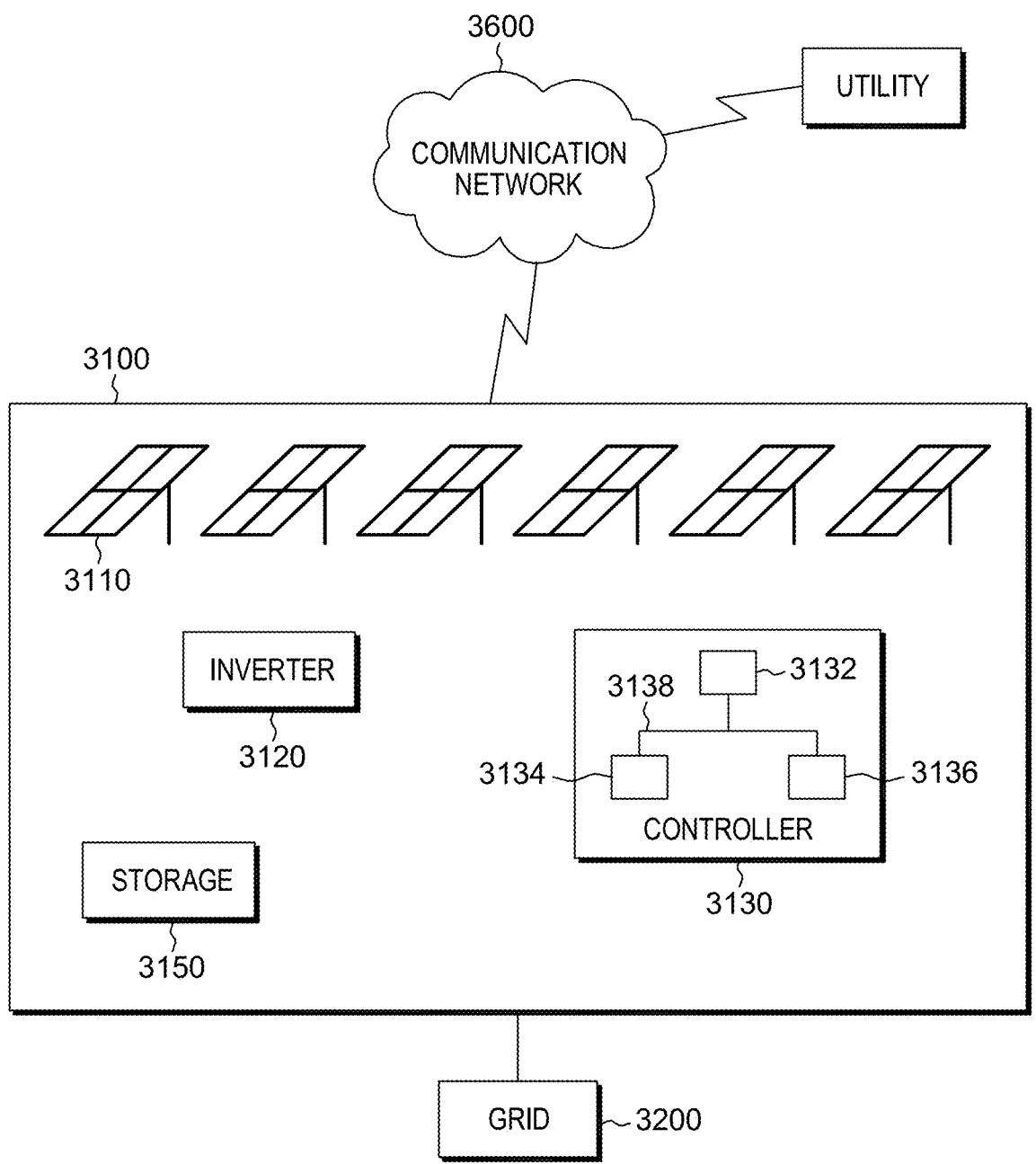
FIG. 14 is a block diagram of one of the plurality of photovoltaic power stations of FIG. 13.

FIG. 14 illustrates one of the plurality of photovoltaic power stations 3100 of grid-tied photovoltaic power system 3000 (FIG. 13). Photovoltaic power station 3100 may generally include a plurality of solar panels 3110, an inverter 3120, and a computing unit or a controller 3130. Controller 3130 may include, but is not limited to, one or more processors or processing units 3132, memory 3134, one or more input/output devices or input/output interfaces 3136, and a bus 3138 that couples the various components together. By way of example, and not limitation, controller may be a microprocessor or other suitable microcontroller. Memory 3134 can include computer readable media in the form of volatile memory, such as random access memory (RAM), and or other removable/non-removable, volatile/non-volatile computer system storage media. Input/output devices 3136 may interface with or communicate with one or more external devices such as global communications network 3600, inverter 3120, and other suitable components.

In some embodiments, photovoltaic power stations 3100 may include a storage 3150. Storage 3150 may allow for storing electrical energy output from photovoltaic power station 3100 that is not supplied to grid 3200. For example, storage 3150 may charged using the reserved power output from photovoltaic power station 3100 that is not supplied to grid 3200. In addition, storage 3150 may allow for further throttling of power and voltage output of solar panel/farms to the grid to adjust for volatility in production or demand. For example, storage 3150 may be employed to provide power output to the grid, when for example, a current requested need for a predetermined power output or a reserve power output based on an earlier forecasted estimated maximum power output or reserve power output is not capable of being supplied by the plurality of solar panels (e.g., due to additional cloud cover). In addition, storage 3150 may be employed to provide power output to the grid, when for example, a current requested need for a reserve power output is greater than an earlier forecasted estimated reserve (e.g., the plurality of solar panels is able to only provide the predetermined and reserve power output). The storage may include batteries such as deep-cycle, lead-acid batteries, lithium-ion batteries, redox flow batteries, or any other suitable batteries. The storage may flywheels, compressed air, pumped-storage hydropower, or other suitable forms for storing energy.

Figure 15:
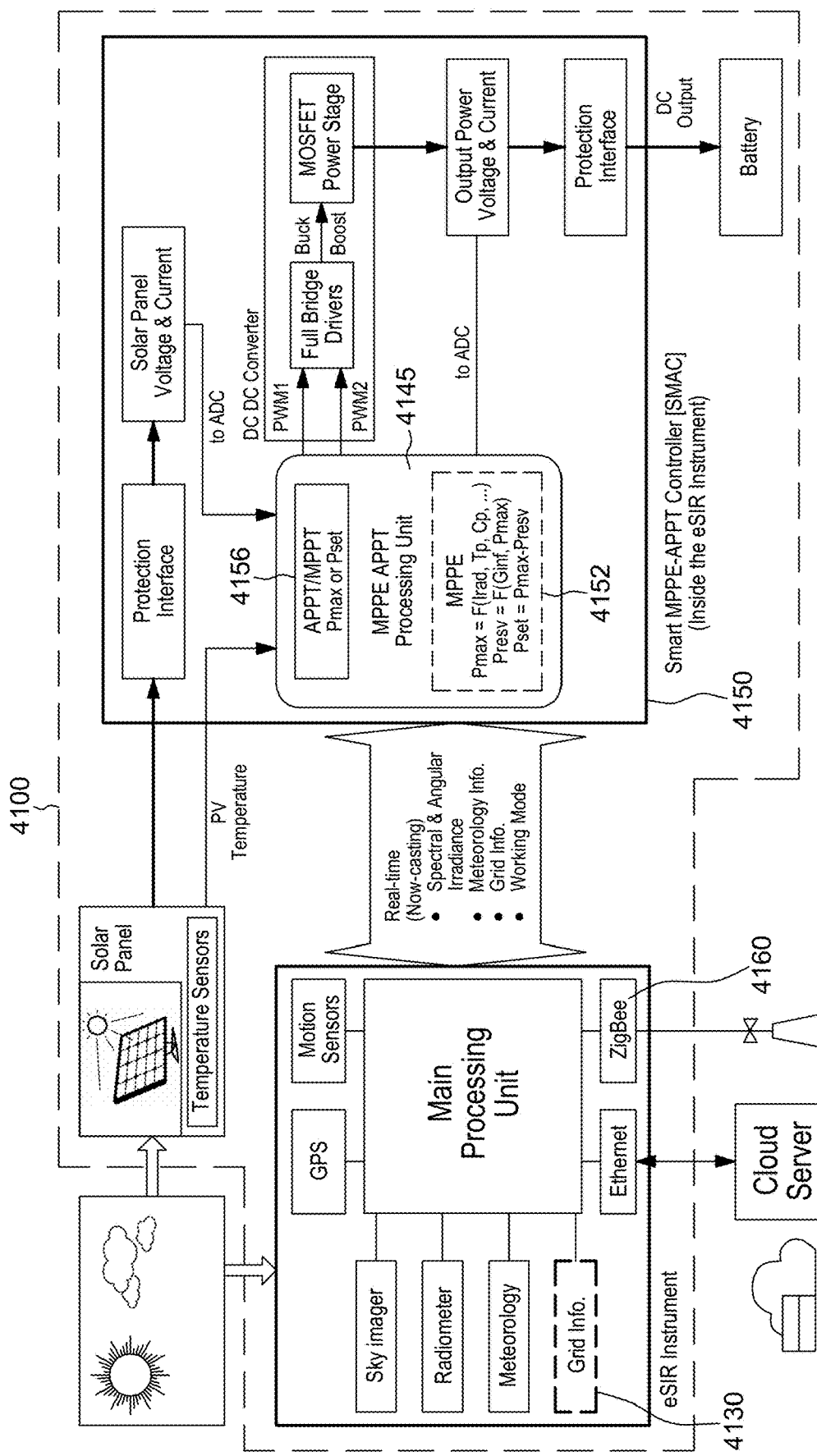
FIG. 15 is a block diagram of a photovoltaic power station operable to retain a reserve power output according to an embodiment of the present disclosure.

FIG. 15 illustrates a photovoltaic power station 4100 according to an embodiment of the present disclosure. Photovoltaic power station 4100 may include a grid frequency monitor module 4130 that may in real-time monitor the stability of grid frequency, which information may be useful for smart maximum power point estimation Adaptive Power Point Tracker (MPPE-APPT) controlling.

An increase in the penetration level of the volatility and the inertia-less nature of solar power may include a smart system centered with radiation and sky imager technology with accurate monitoring and intelligent control functionality. For example, added functionality may include the following:

1) Grid information sensing module 4130, such as frequency and/or voltage sensors for sensing grid stability, or linkage to utility, ISO, or RTO for grid information.
2) A maximum power point estimation algorithm module 4152 to estimate the maximum power potential with monitored solar radiation, grid information, meteorology conditions, PV panel front and back temperatures, and PV panel characteristics; and also to estimate a proper power reserve margin based on grid information and maximum power point estimation or set by utility, ISO, and RTO so that the preserved power margin can be automatically dispatched during frequency transients.
3) A smart MPPE-APPT controller module 4150 by integrating the maximum power point estimation algorithm (MPPE) module 4152 with an adaptive (controlled) power point tracker (APPT) module 4156 by modifying an input from a radiometer and sky imager power-board.
4) A communication module 4160 for wireless bi-directional communication, such as ZigBee which provides a cost-effective, standards-based wireless networking solution that supports low data-rates, low-power consumption, security, and reliability.

Thus, photovoltaic power station 4100 may include a central station of the smart system with internet communication capability to the cloud-based server. The system may 1) accurately monitor both spectral direct and diffuse solar radiation, cloud distribution, and cloud motion, meteorological conditions, and grid conditions, 2) estimate the maximum power output for the PV panel under current conditions and the reserve margin for controlling the PV panel power output, 3) intelligently control the real power output of Pset, 4) broadcast the monitored information through a communication module to other smart MPPE-APPT controller modules that have no radiation and meteorology sensing capability, and 5) collect the work status information of PV arrays from other smart MPPE-APPT controller modules through bi-way communication network.

A smart MPPE-APPT module may be combined with GPS, motion-tracking sensor, PV panel temperature sensors, and communication module to form a standalone smart MPPE-APPT controller subsystem. The GPS-enabled and motion-tracked subsystem with bi-directional communication and onboard processing capability can 1) receive the spectral solar radiation, meteorology, and grid information broadcasted, 2) estimate the PV system maximum power point and the reserved power margin, 3) then intelligently control PV system power output; and 4) send the work status information of PV arrays to the central system.

Figure 16:
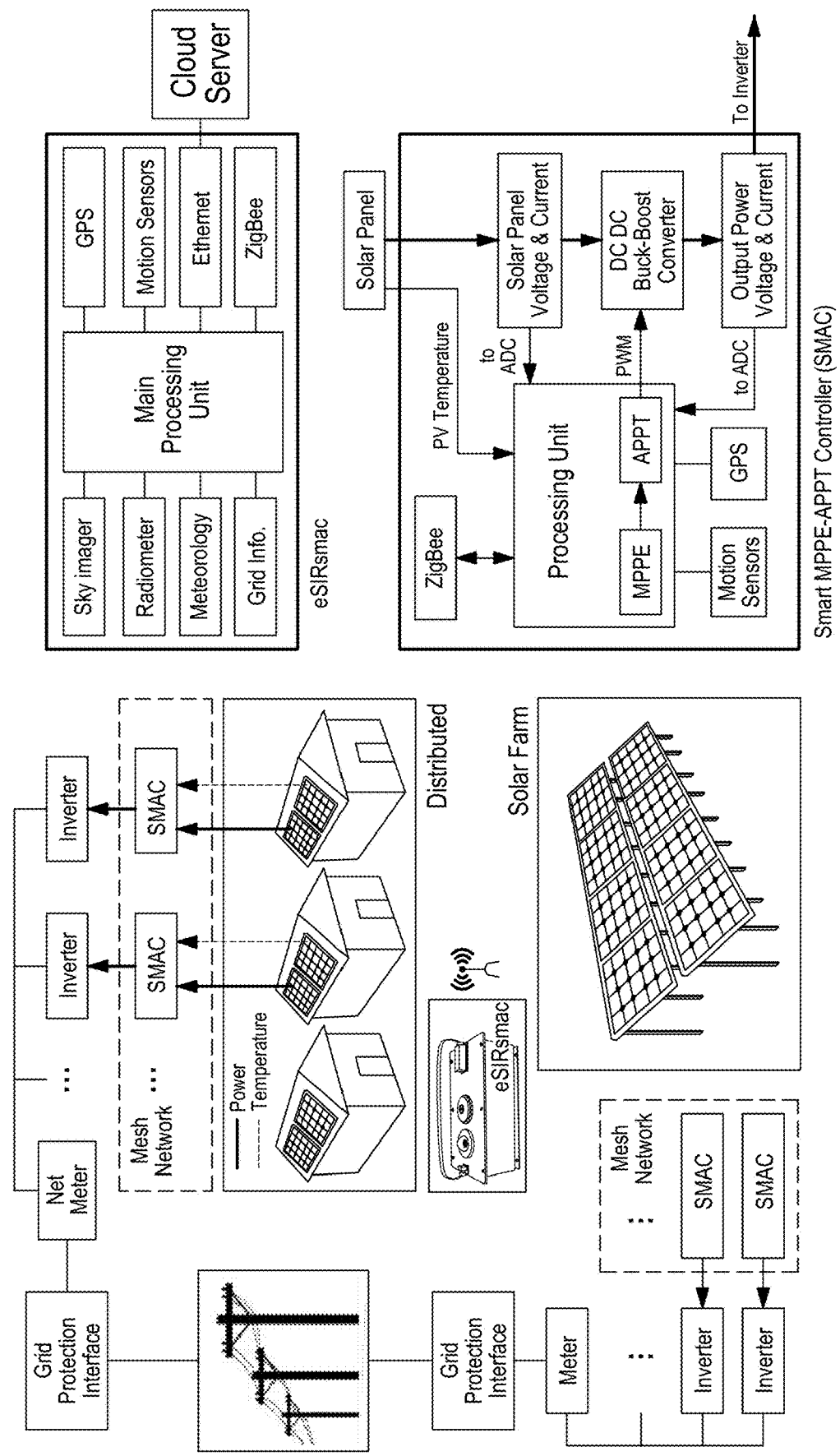
FIG. 16 is a block diagram of a photovoltaic power stations operable to retain a reserve power output according to an embodiment of the present disclosure.

A plurality of smart MPPE-APPT controller controlled PV panels or systems may form a local mesh network. The system can be deployed in the utility-scale solar farms or the distributed PV systems of residential/commercial areas, as shown in FIG. 16. The system is able to 1) accurately monitoring solar radiation and power generation of PV systems, meteorology and grid information, and 2) intelligently control PV system power output with a reserve margin, enabling a proportional controller in PV form based on system frequency deviation, similar to the speed governor of conventional synchronous generators used for primary frequency control.

The system may accurately monitor and predict solar energy production, and intelligently control and manage PV system power output with a power reserve margin. It may effectively enable the volatility and inertia-less nature of solar power systems to have a power reserve margin with adaptive control, as the preserved power can be intelligently dispatched during frequency transients to stabilize the grid. Thus, the system may enable utilities, ISOs, and RTOs to better mitigate the volatility of solar power and provide a proportional controller in PV farms, based on system frequency deviation.

The methods and systems of the present disclosure may lower interconnection burdens for utility scale, commercial and industrial scale, and residential solar photovoltaic systems without costly Battery Energy Storage Systems (BESS) to increase the penetration of solar energy. Also, the integrated system may enable providing accurate monitoring information of solar radiation, meteorology, solar energy generation, and management information to the stakeholders/customers. Evaluation of the estimated PV outputs from monitored solar radiation and meteorology conditions with the actual PV outputs may enable solar farms to better plan operation and maintenance (O&M) for enhancing solar panel efficiency and reducing overall O&M costs (improving the bottom line profitability of operations). With its smart control on inverters, it may output zero energy to prevent hazardous and costly Distributed Energy Resources (DER) islanding impacts when the grid fails.

Figure 17:
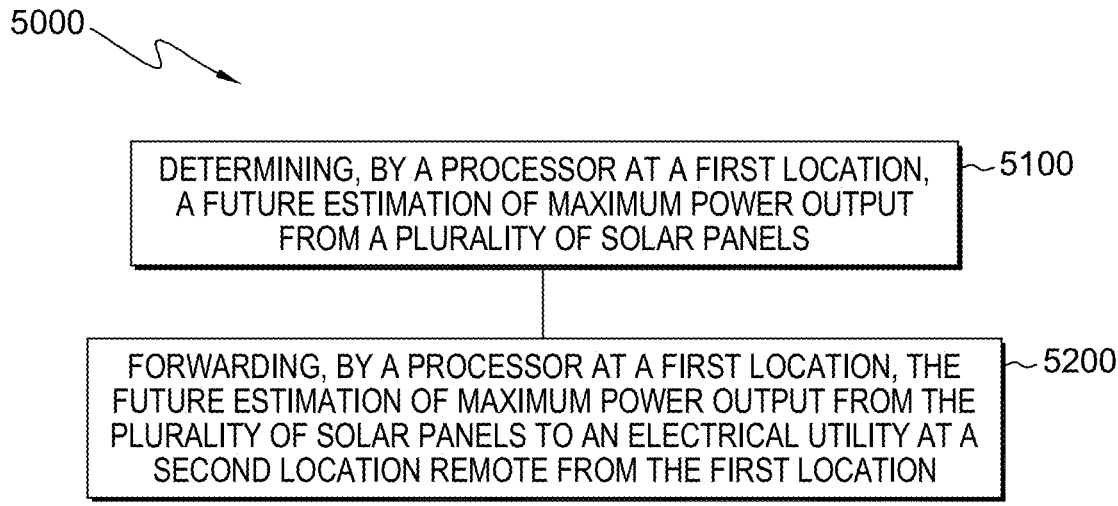
FIG. 17 is a flowchart of a method according to an embodiment of the present disclosure.

FIG. 17 illustrates a method 5000 according to an embodiment of the present disclosure. For example, method 5000 may be implemented by an operator of a photovoltaic power station or one or more solar panels such as disposed on a home or business as described above. Method 5000 may include at 5100 determining, by a processor at a first location, a future estimation of maximum power output from a plurality of solar panels, and at 5200 forwarding, by a processor at a first location, the future estimation of maximum power output from the plurality of solar panels to an electrical utility at a second location remote from the first location.

The method may further include receiving, by the processor at the first location, a first request from the electrical utility for a predetermined future supply of power output to the electrical grid less than the future estimation of maximum power output so as to maintain a reserve power output operable to provide the reserve power output to the electrical grid. The method may further include receiving, by the processor at the first location, a second request from the electrical utility for a supply of power output to the electrical grid comprising at least a portion of the reserve power output. The determining may include determining the future estimation of maximum power output based on irradiance, temperature, and a coefficient at the first location. The determining may include determining the future estimation of maximum power output based on a sensor for use in measuring spectral radiation, an imager for use in imaging the sky, and a shadowband movably positionable over said sensor and said spaced apart imager.

Figure 18:
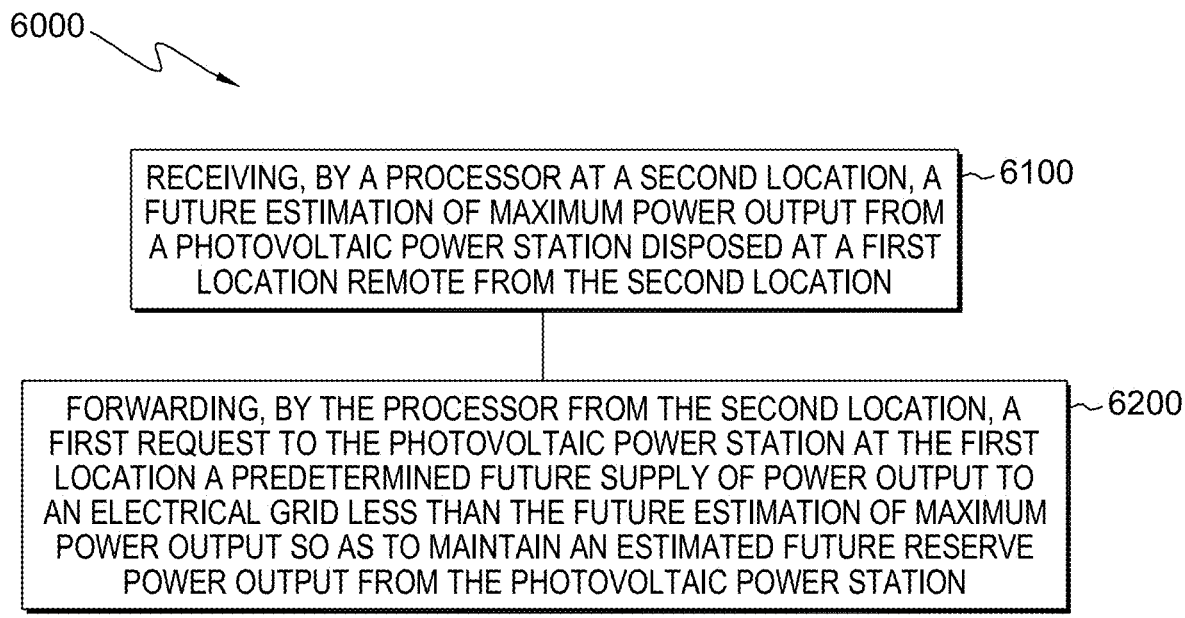
FIG. 18 is a flowchart of a method according to an embodiment of the present disclosure.

FIG. 18 illustrates a method 6000 according to an embodiment of the present disclosure. For example, method 6000 may be implemented by utility operator operably connected to one or more photovoltaic power station or one or more solar panels such as disposed on a home or business such as described above. Method 6000 may include at 6100 receiving, by a processor at a second location, a future estimation of maximum power output from a photovoltaic power station disposed at a first location remote from the second location, and at 6200 forwarding, by the processor from the second location, a first request to the photovoltaic power station at the first location a predetermined future supply of power output to an electrical grid less than the future estimation of maximum power output so as to maintain an estimated future reserve power output from the photovoltaic power station.

The method may further include receiving the requested supply of power output to the electrical grid, and distributing the requested supply of power output to a plurality of consumers. The method may further include forwarding, by the processor from the second location, a second request to the photovoltaic power station at the first location for at least a portion of the estimated future reserve power output. The method may further include receiving the requested at least the portion of the estimated future reserve power output to the electrical grid, and distributing the requested at least the portion of the estimated future reserve power output to the plurality of consumers. The receiving may include receiving, by the processor at the second location, the future estimation of maximum power output from the photovoltaic power station based on, at the first remote location, irradiance, temperature, and a coefficient. The receiving may include receiving, by the processor at the second location, the future estimation of maximum power output from the photovoltaic power station based on, at the remote first location, a sensor for use in measuring spectral radiation, an imager for use in imaging the sky, and a shadowband movably positionable over the sensor and the spaced apart imager.

The present disclosure provides methods and systems that may be able to 1) accurately monitor solar radiation and power generation, and meteorology, and grid information, 2) preserve a power margin in PV systems that can be automatically dispatched during frequency transients to stabilize the grid, 3) intelligently control and manage PV system power output at pre-set power output level (Power_set=Power_maximum−Power_reserve), and 4) collect the work status information of PV arrays through a both-way communication mesh network.

Underling principals for an approach for a system and method according to the present disclosure may include 1) estimating the maximum power potential at the concurrent conditions, 2) controlling PV system to output at the desire level, so that the PV system can produce maximum solar power with a reserve margin, and 3) preserving power margin in PV systems that can be automatically dispatched during frequency transients to stabilize the grid.

The systems and methods have the potential to lower interconnection burdens for commercial and industrial scale power production and increase the penetration of solar energy. With control of inverters, the system may prevent DER islanding impacts. The systems and methods may be implemented by solar energy producers, developers, distributors, and researchers to maximize solar energy and quality of service.

As described above, the system and methods may employ a sky imager-radiometer, which measures accurate spectral and angular solar radiation distribution and meteorological parameters for monitoring solar radiation and weather conditions. For example, the sky imager-radiometer may include three sub-sensor components: radiometer, sky imager, and meteorology sensors. Both radiometer and sky imager may share a scanning shadowband with controlled rotation. The simultaneous measurements of the solar aureole (plus direct) and diffuse radiations using the same detector may be a multi-fold improvement in the radiometric calibration of both direct and diffuse radiations (e.g., within 1~2% uncertainty).

With an analytics package, a sky imager-radiometer may enable accurate retrievals of optical properties of aerosol, cloud, ozone, and water vapor (including aerosol and cloud particle size) in the atmosphere. The shared scanning shadowband blocks the sun for the sky imager, which enhances the dynamic range of the sky imager to detect optically thin clouds for cloud sky distribution and cloud motion. The sky imager-radiometer may be a ruggedized, modular, GPS-enabled, web-enabled, and motion-tracked with solar powered operation.

For solar powered operation, a sky imager-radiometer employed at a solar photovoltaic system may be a power management module with multiple sensors, power regulation circuits, and a processing unit. The power management module may operably control PV panel output with MPPT function, to monitor and manage system power consumption and battery condition. The power management module may combine communication, computing, remote sensing, and also respond to feedback from the prevailing environment to deliver improved accuracy and performance. The power management module may include seven wavelength channels at 415, 500, 610, 665, 780, 940, and 1640 nanometers, spanning the wavelength range of most PV panel's spectral response. With on-board processing power for analytics of spectral and image processing and control, the power management module may be operable to monitor solar radiation and to forecast short-term solar energy generation.

The present disclosure may increase the penetration level of the volatility and inertia-less nature of solar power based on a combination sky imager-radiometer. Such systems and methods may include the following:

1) Accurate measurements of solar radiation, meteorology, and grid information with sky imager-radiometer instrument.
2) Accurate estimation of the maximum power potential (MPPE) with monitored solar radiation and grid information, setting a maximum/optimal power output with a power margin/reserve in PV systems; so that the preserved power margin can be automatically dispatched during frequency transients.
3) Intelligent control of PV system power output at the pre-set level (Power_set=Power_maximum−Power_reserve) through an adaptive power point tracker (APPT). The APPT is similar to MPPT (Maximum Power Point Tracker) but operates at an adaptive (controlled) power point level, so that the PV system can produce controlled (adaptive to the current sky and grid conditions) solar power with a reserve margin by the Smart MPPE-APPT Controller.
4) Broadcasting monitoring information capability by sky imager-radiometer with a communication module.
5) A smart MPPE-APPT controller that can receive the broadcasted concurrent solar radiation, meteorology and grid information and locally measured panel temperatures to control PV system power output with a power reserve margin.

To mitigate the volatility and inertia-less nature of solar power, advantages of a smart system may include 1) accurately monitoring solar radiation and power generation of PV systems, meteorology and grid information, and 2) intelligently controlling PV system power output with a reserve margin, enabling a proportional controller in PV systems based on grid system frequency deviation.

Such techniques of the present disclosure may enable greater penetration of solar energy, at both utility scale and distributed residential and commercial PV systems levels, into the grid. The techniques of the present disclosure may aid in reducing Green House Gas (GHG) emissions and reliance on fossil fuels like coal and natural gas. Based on calculations provided by the Long Island Solar Farm, each megawatt of solar energy generation may result in annual carbon emission reduction of 1,000 metric tons.

The design of sky imager-radiometer allows for the capability of measuring solar aureole to derive aerosol loading and aerosol particle size, a feature for monitoring PM2.5 (and air quality) in the atmosphere. This may improve an understanding of air quality and public health effects issues related to all aspects of energy production and use, including storage and distribution. The deployment of sky imager-radiometers may bring multifaceted environmental benefits such as emission reductions and air quality monitoring that will enhance the quality of life.

The system may operate at different modes as required or adaptively sensed from environments: 1) the regular MPPT mode to output the maximum power from PV panels, 2) preserve solar power mode to optimize PV output for giving a reserve margin to address frequency deviations during major disturbances, and 3) anti-island ("safety") model to shut down PV system generation when the grid fails. Again, the bi-way communication capability enables a flexibility in setting the mode for different customer needs.

The techniques of the present disclosure may be incorporated into existing photovoltaic power systems.

A sample of further systems and methods that are described herein follows:

A1. A system comprising: a sensor for use in measuring spectral radiation; an imager for use in imaging the sky; a shadowband movably positionable over said sensor and said spaced apart imager; and a computing unit operably connected to said sensor, said imager, and said shadowband. A2. The system of claim 1 wherein said imager being spaced from said sensor, and said shadowband movably positionable over said sensor and said spaced apart imager. A3. The system of claim A2 wherein said imager being spaced from said sensor a distance greater than about 1 inch. A4. The system of claim A1 wherein said computing unit is adapted to obtain an image of the sky using said imager based on measurement of spectral radiation using said sensor. A5. The system of claim A1 wherein said computing unit is adapted to calibrate said imager for imaging the sky based on the measurement of spectral radiation using said sensor. A6. The system of claim A1 wherein said computing unit is adapted to control exposure of said imager for imaging the sky based on the measurement of spectral radiation using said sensor. A7. The system of claim A1 wherein said computing unit is adapted to control the shadowband to obtain an image of the sky using said imager and measurement of spectral radiation using said sensor. A8. The system of claim A1 wherein said computing unit is adapted to obtain the spectral radiation measurement of the sky and to obtain said image of the sky generally simultaneously. A9. The system of claim A1 wherein said sensor comprises a filter for use in connection for use in measuring spectral radiation. A10. The system of claim A1 wherein said sensor comprises a diffuser for use in connection with said sensor for use in measuring spectral radiation. A11. The system of claim A1 wherein said imager comprises a CCD imager or a CMOS imager, and said sensor comprises one or more a photodiodes. A12. The system of claim A1 wherein said imager is operable to provide a 180-degree horizon-to-horizon image of the sky.

B1. A system comprising: a radiometer for measuring spectral radiation of a sky; a sky imager for imaging the sky; and a shadowband movably positionable over said radiometer and said sky imager. B2. The system of claim B1 wherein said imager being spaced from said sensor, and said shadowband movably positionable over said sensor and said spaced apart imager. B3. The system of claim B2 wherein said imager being spaced from said sensor a distance greater than about 1 inch. B4. The system of claim B1 wherein said radiometer comprises a sensor for use in measuring spectral radiation of the sky and said sky imager comprises an imager for use in imaging the sky. B5. The system of claim B1 wherein said system is operable to measure angular distribution of radiation. B6. The system of claim B1 wherein said imager comprises a CCD imager or a CMOS imager, and said sensor comprises one or more a photodiodes. B7. The system of claim B1 wherein said sky imager is operable to provide a 180-degree horizon-to-horizon image of the sky. B8. The system of claim B1 wherein said sensor comprises a filter for use in connection for use in measuring spectral radiation. B9. The system of claim B1 wherein said sensor comprises a diffuser for use in connection with said sensor for use in measuring spectral radiation. B10. The system of claim B1 wherein said radiometer and said sky imager are operable to obtain a spectral radiation measurement of the sky and an image of the sky generally simultaneously. B11. The system of claim B1 wherein said sky imager is operable to obtain an image of the sky based on a spectral radiation measurement of the sky by said sensor.

C1. A method comprising: obtaining a spectral radiation measurement of the sky; and obtaining an image of the sky based on the obtained spectral radiation measurement. C2. The method of claim C1 wherein the obtaining the spectral radiation measurement of the sky and the obtaining the image of the sky occur generally simultaneously. C3. The method of claim C1 wherein the obtaining the image of the sky comprises: calibrating an imager based on the obtained spectral radiation measurement. C4. The method of claim C1 wherein the obtaining the image of the sky comprises: determining an image exposure based on the obtained spectral radiation measurement. C5. The method of claim C1 wherein the obtaining the image of the sky comprises obtaining a first image at a first exposure and obtaining a second image at a second exposure, and wherein the second exposure is based on the first image. C6. The method of claim C5 wherein the second exposure is longer than the first exposure. C7. The method of claim C1 further comprising: blocking a portion of the sky while obtaining the spectral radiation measurement and the image of the sky. C8. The method of claim C7 wherein the blocking comprises moving a shadowband. C9. The method of claim C7 wherein the obtaining the spectral radiation measurement of the sky comprises obtaining one or more wavelength measurements of the sky. C10. The method of claim C9 wherein the obtaining the spectral radiation measurement of the sky comprises obtaining one or more wavelength measurements comprising 415 nanometers, 500 nanometers, 610 nanometers, 665 nanometers, 860 nanometers, 940 nanometers, and/or 1640 nanometers.

D1. A method comprising: obtaining a spectral radiation measurement of the sky; obtaining an image of the sky based on the obtained spectral radiation measurement; and obtaining a characteristic based on the obtained spectral radiation measurement and/or the obtained image of the sky. D2. A method of claim D1 wherein the obtaining the characteristic comprises obtaining a characteristic solar aureole based on the obtained spectral radiation measurement and/or the obtained image of the sky. D3. A method of claim D1 wherein the characteristic comprises a radiation measurement, an aerosol measurement, a cloud measurement, and/or a sky condition measurement. D4. A method of claim D1 wherein the characteristic comprises monitoring aerosols and/or clouds. D5. A method of claim D1 wherein the characteristic comprises monitoring solar energy. D6. A method of claim D1 wherein the characteristic comprises forecasting for solar energy. D7. A method of claim D1 wherein the characteristic comprises estimating the conversion or power efficiency of a solar photovoltaic array. D8. A method of claim D1 wherein the characteristic comprises accurately correcting the forward scattering for radiation and calibration.

It is to be understood that the above description is intended to be illustrative, and not restrictive. For example, the above-described embodiments and/or aspects thereof may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

This written description uses examples in the present disclosure, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a shadowband assembly including:
a motor,
a mount positioned opposite the motor, and
an elongated band extending between the motor and the mount, the elongated band including a first end operably attached to the motor, and a second end, opposite the first end, pivotally attached to the mount;
a sensor for use in measuring spectral radiation, the sensor positioned between the motor and the mount of the shadowband assembly;
an imager for use in imaging the sky, the imager positioned adjacent the sensor,
wherein the elongated band of the shadowband assembly is movably positionable over and covers the sensor and the imager concurrently; and
a computing unit operably connected to the sensor, the imager, and the shadowband assembly.

2. The system of claim 1 wherein the computing unit is adapted to calibrate the imager for imaging the sky based on the measurement of spectral radiation using the sensor.

3. The system of claim 1 wherein the computing unit is adapted to control exposure of the imager for imaging the sky based on the measurement of spectral radiation using the sensor.

4. The system of claim 1, wherein the imager is positioned between the sensor and one of:
the motor of the shadowband assembly, or
the mount of the shadowband assembly.

5. The system of claim 1, further comprising a single housing containing the shadow band assembly, the sensor, the imager, and the computing unit.

6. The system of claim 1 further comprising:
a plurality of solar panels at a first location, the plurality of solar panels operable to provide a maximum power output based on the computing unit;
a controller operable to supply, from the plurality of solar panels, a predetermined power output less than the maximum power output to an electrical grid; and
wherein the controller is operable to maintain, from the plurality of solar panels, a reserve power output for providing reserve power output to the electrical grid, the reserve power output being the difference between the maximum power output and the predetermined power output.

7. The system of claim 6 wherein the controller is operable to supply, from the plurality of solar panels, a power output comprising at least a portion of the reserve power output to the electrical grid.

8. The system of claim 6 wherein the controller is operable to determine a future estimation of maximum power output from the plurality of solar panels disposed at the first location, and forward the future estimation of maximum power output to an electrical utility disposed at a second location remote from the first location.

9. The system of claim 8 wherein the controller is operable to receive, at the first location, a first request from the electrical utility for a predetermined future supply of power output to the electrical grid less than a future estimation of maximum power output.

10. The system of claim 9 wherein the controller is operable to receive, at the first location, a second request from the electrical utility for a supply of power output to the electrical grid comprising at least a portion of the reserve power output to the electrical grid.

11. The system of claim 6 wherein the controller is operable to determine, at a first location, the maximum power output from the plurality of solar panels, and wherein the maximum power output is based on irradiance, temperature, and at least one coefficient regarding the plurality of solar panels at the first location.

12. The system of claim 6 wherein the controller is operable to determine, at a first location, the maximum power output from the plurality of solar panels based on the sensor for use in measuring spectral radiation, the imager for use in imaging the sky, and the elongated band of the shadowband assembly movably positionable over the sensor and the imager.

13. The system of claim 6 wherein the controller is operable to supply the predetermined power output to the electrical grid based on an orientation of the plurality of solar panels.

14. The system of claim 6 wherein the controller is operable to supply the predetermined power output to the electrical grid based on an inverter.

15. A system comprising:
a housing including:
 a shadowband assembly including an elongated band having a first end operably attached to a motor coupled to the housing, and a second end, opposite the first end, pivotally attached to a mount coupled to the housing opposite the motor;
 a radiometer for measuring spectral radiation of the sky, the radiometer positioned on the housing between the first end and the second of the elongated band of the shadowband assembly; and
 a sky imager for imaging the sky, the sky imager positioned on the housing adjacent the radiometer,
 wherein the elongated band of the shadowband assembly is movably positionable over and covers the radiometer and the sky imager concurrently.

16. The system of claim 15 wherein the sky imager is operable to obtain an image of the sky based on a spectral radiation measurement of the sky.

17. A method comprising:
obtaining a spectral radiation measurement of the sky using a radiometer positioned on a housing;
obtaining an image of the sky based on the obtained spectral radiation measurement using a sky imager positioned on the housing, adjacent the radiometer;
simultaneously blocking a portion of the sky while obtaining the spectral radiation measurement and the image of the sky using an elongated band of a shadowband assembly positioned on the housing; and
calibrating an imager based on the obtained spectral radiation measurement.

* * * * *